United States Patent

Rosenzweig et al.

Patent Number: 5,883,487
Date of Patent: Mar. 16, 1999

[54] METHOD AND APPARATUS FOR DETERMINING THE SPEED OF ROTATION OF AN AC MOTOR

[75] Inventors: Emil Rosenzweig; Oscar Khutoryansky, both of Glenview; Thomas Simak, Warrenville, all of Ill.

[73] Assignee: Continental X-Ray Corporation, Broadview, Ill.

[21] Appl. No.: 900,613

[22] Filed: Jul. 25, 1997

[51] Int. Cl.[6] ............................. G01P 3/46; H01J 35/10
[52] U.S. Cl. ..................... 318/781; 318/459; 318/779; 378/131
[58] Field of Search ...................... 318/268, 271, 318/459, 749, 751, 779, 781, 786, 798, 799, 819, 823; 378/121, 131, 135

[56] References Cited

U.S. PATENT DOCUMENTS

| | | |
|---|---|---|
| 3,439,245 | 4/1969 | Perdue . |
| 3,943,356 | 3/1976 | Schmutzer et al. . |
| 3,963,930 | 6/1976 | Fiocca et al. . |
| 4,204,425 | 5/1980 | Mallick, Jr. . |
| 4,225,787 | 9/1980 | Shapiro et al. . |
| 4,316,129 | 2/1982 | Shapiro et al. . |
| 4,358,722 | 11/1982 | Iwakane et al. . |
| 4,468,598 | 8/1984 | Wagner . |
| 4,495,448 | 1/1985 | Dumbeck . |
| 4,622,506 | 11/1986 | Shemanski et al. ............ 318/786 |
| 4,658,195 | 4/1987 | Min ............................... 318/786 |
| 4,839,834 | 6/1989 | Omae et al. . |
| 4,862,053 | 8/1989 | Jordan et al. ................... 318/786 |
| 5,140,246 | 8/1992 | Rarick .......................... 318/779 |
| 5,276,392 | 1/1994 | Beckerman ................... 318/751 |
| 5,367,241 | 11/1994 | Lee et al. . |

Primary Examiner—Bentsu Ro
Attorney, Agent, or Firm—Laff, Whitesel, Conte & Saret, Ltd.

[57] ABSTRACT

A speed control apparatus for determining and controlling the speed of rotation of a rotor in an AC motor. The motor includes a stator having main and auxiliary windings. Main and auxiliary winding controllers control the operational input signals supplied to the main and auxiliary windings by a signal generator. A pulse generator is connected to the main winding for providing a test pulse during a speed measurement operation. The test pulse magnetizes a portion of the rotor which induces a feedback EMF signal in the auxiliary winding. A feedback sensor circuit receives the feedback signal and forwards it to a microprocessor. The microprocessor calculates the rotational speed of the rotor based on the feedback signal.

39 Claims, 4 Drawing Sheets

METHOD AND APPARATUS FOR DETERMINING THE SPEED OF ROTATION OF AN AC MOTOR

FIELD OF THE INVENTION

The present invention relates to methods and apparatus for determining the speed of asynchronous AC electrical motors. More particularly, the present invention relates to methods and apparatus for determining the rotational speed of AC electrical motors using rotational speed feedback information.

BACKGROUND INFORMATION

A conventional asynchronous AC electrical motor comprises a rotor and a stator both made of ferromagnetic material of high permeability. The stator, which is the stationary part of the motor, consists of a core and a set of windings. The core is typically constructed using laminated steel and the windings are typically made of copper wire wound around the core. The purpose of the stator is to produce a strong electromagnetic field in which the rotor turns.

The rotor is the part of the motor that is configured to rotate. The rotor is typically positioned inside the stator. The rotor consists of a core, made from magnetic steel, and a shaft. The core is generally pressure fitted onto the shaft. The shaft transmits the mechanical energy converted by the motor from electrical energy to a load.

The stator windings are fed by multi-phase currents to produce a rotating magnetic field. Depending on the geometric layout of the windings and on the current in them, different configurations of the magnetic field in the motor may be produced. Because of Faraday's law, the stator magnetic field causes an EMF to be induced on the rotor which generates current in the rotor. This current interacts with the magnetic field and produces a torque that rotates the rotor.

A common two-phase motor consists of two sets of windings on the stator. The first set is the main winding or the run winding. The second set is the auxiliary or start winding. The two windings are connected in parallel with each other.

When the motor is initially energized, voltage is applied across both windings. In order to create a rotating magnetic field, the phase of the applied voltage on the start winding must be shifted from the voltage on the run winding. This can be done by placing a capacitor in series with the start winding. The phase shift can also be created electronically.

In many applications, it is important to accurately determine and control the rotational speed of the rotor in an electric motor. One example in which this is important is the use of an electric motor to rotate the anode of an xray tube to produce a high power output x-ray tube.

Modern rotating anode x-ray tubes include a rotor, positioned in the vacuum inside of the glass x-ray tube envelope, and a stator positioned outside the glass envelope. The rotor shaft is connected to an x-ray tube anode, which is typically a large disc of tungsten or an alloy of tungsten, causing the anode to rotate with the motor rotor when an x-ray exposure is being made.

The ability of the x-ray tube to achieve desirable high power x-ray outputs is limited by the heat generated on the anode in the x-ray tube. The purpose of the rotating anode is to spread the heat produced during an exposure over a large area of the anode. Thus by rotating the anode, it has been possible to produce x-ray tubes capable of withstanding the substantial heat generated by high power x-ray tube outputs.

In a typical rotating anode x-ray tube, the standard number of revolutions of the anode is approximately 3,600 RPM for normal exposures and 10,000 RPM for high intensity exposures. The speed is set by predetermining a motor input signal which is expected to achieve the desired speed, applying the predetermined motor input to the motor prior to making an x-ray exposure and waiting a predetermined amount of time for the rotor to get up to speed. In practice, the anode never reaches a speed of 3,600 RPM or 10,000 RPM because of mechanical factors such as slipping between the rotor and the bearings. Thus, a speed correction (usually −10% to −20%) is generally assumed when calculating the predetermined motor input.

Typically, in order to maintain a rotational speed of 3,600 RPM a 60 VAC motor input signal is provided and in order to maintain a rotational speed of 10,000 RPM a motor input signal of 100 VAC is provided. The normal acceleration time for a 3" anode is around 2 seconds. The normal acceleration time for a 4" anode is approximately 2.5–3.0 seconds. During the time required to bring the rotor up to speed, the system is "on hold" and radiographic exposure is not allowed.

The extremely adverse conditions created by high power x-ray exposures make measuring the actual speed of rotation of the anode very difficult. Furthermore, motors used for rotating the anode in a rotating anode x-ray tube typically have a very low efficiency due to the large vacuum, air and glass gap between the rotor and stator winding. Thus, conventional methods of measuring the rotational speed of a motor rotor are typically not effective for measuring the speed of rotation of the anode in a rotating anode x-ray tube.

Current x-ray apparatus often make the assumption that if they provide the predetermined motor input signal and wait the predetermined amount of time then the anode will be rotating at the appropriate speed. These systems do not actually measure the speed of rotation of the anode. Thus, the possibility exists that if the circuitry or motor fails, exposure could be made on a stationary anode destroying the x-ray tube.

Additionally, in most cases, the anode rotational speed does not need to be at its maximum in order for exposure to begin. By allowing exposure at speeds lower than the maximum, valuable time can be saved and the optimum parameters can be achieved. However, prior art systems that do not actually measure the rotational speed of the anode cannot take advantage of these efficiencies.

Prior art devices that do measure the speed of rotation of the anode do so indirectly, such as by using a vibration tachometer. However, these methods typically are complicated, require expensive equipment and are not very accurate. Furthermore, vibration tachometers typically only indicate when a rotor is rotating at a predetermined speed. They do not provide any information regarding the rotor speed if the rotor is rotating at an intermediate speed. Thus, it is apparent that there is a need for an improved method of measuring the speed of rotation of an AC motor rotor.

An object of the present invention is to provide a simple and accurate method of measuring the actual speed of rotation of the rotor in an AC motor.

Another object of the present invention is to provide a method and apparatus for accurately measuring the actual speed of rotation of an anode in a rotating anode x-ray tube.

SUMMARY OF THE INVENTION

These needs and other needs are satisfied by the method and apparatus for measuring the actual speed of rotation of a rotor in an AC motor of the present invention.

A speed control apparatus for determining the speed of rotation of a rotor in a motor having a stator with main and auxiliary windings according to the present invention comprises an input signal controller, main and auxiliary winding controllers, a pulse generator, a feedback sensor circuit and a microprocessor.

During normal operation, the input signal controller provides motor input signal information to the main and auxiliary winding controllers. The main winding controller, which is connected to the input signal controller, synthesizes the input signal supplied to the main winding and the auxiliary winding controller, which is also connected to the input signal controller, synthesizes the input signal supplied to the auxiliary winding.

The pulse generator is connected to the main winding controller and signals the main winding controller to provide a test input pulse of limited duration to the main winding during the speed measurement operation. The feedback sensor circuit is connected to the auxiliary winding and receives a feedback signal from the auxiliary winding produced in response to the test input pulse during the speed measurement operation. The microprocessor is connected to the feedback sensor circuit and determines the speed of rotation of the rotor based on the feedback signal produced in the auxiliary winding.

During normal operation, both the main and auxiliary windings are provided with sinusoidal AC input signals. The amplitude and frequency of the input signal is determined by the microprocessor and depends on the reahuested operational routine. In order to create a rotating magnetic field, the input signal provided to the auxiliary winding is phase offset from the main winding signal.

When a speed measurement is requested, the input signals are removed from both the main and auxiliary windings for a predetermined time to demagnetize the rotor. After the predetermined time has elapsed, the pulse generator signals the main winding controller to generate a test input pulse which is supplied to the main winding.

The test pulse creates a momentary EMF which magnetizes a portion of the rotor creating a "virtual permanent magnet" which is rotating with the rotor at the rotor's rotational speed. The test input pulse must not exceed a half period of rotation of the highest possible rotational speed of the rotor or else the rotor may become demagnetized. The rotating "virtual permanent magnet" creates an EMF feedback signal in the auxiliary winding which is detected by the feedback sensor circuit and fed to the microprocessor.

The feedback sensor circuit measures the amplitude of the EMF feedback signal and records the peak voltage value of the EMF feedback signal. The feedback sensor circuit sends feedback signal information, including the peak value and feedback signal frequency, to the microprocessor which determines the speed of rotation of the rotor based on the feedback signal information.

In order to accurately measure the speed of rotation of the rotor, the system must be calibrated. Calibration is accomplished by measuring the peak value of the feedback signal at several speeds to determine a peak value verses speed profile for the system. It is possible to take frequency and peak value measurements at a high rotational speed using the feedback sensor circuit in order to perform a self-calibration for the system.

The microprocessor uses the speed profile to convert peak value measurements into the actual speed of rotation of the rotor. The microprocessor can adjust the speed of rotation of the rotor, if desired, by varying the amplitude or frequency of the motor input signals generated by the winding controllers. The speed adjustment process can be iterative in nature creating a closed loop rotational speed control system which can efficiently optimize the speed of rotation of the motor rotor.

In a preferred embodiment, the motor is part of a rotating anode x-ray tube. In a rotating anode x-ray tube, the anode of the x-ray tube is connected to the motor rotor and is configured to rotate with the motor rotor. The anode and motor rotor are located inside the vacuum sealed x-ray tube glass envelope and the stator is located outside of the glass envelope. An x-ray generator is also connected to the microprocessor. The x-ray generator generates large amounts of power for the exposure operation and receives and sends control signals to and from the microprocessor controlling operation of the x-ray apparatus.

By measuring the actual speed of rotation of the rotor and thus the anode in a rotating anode x-ray tube it is possible to reduce the time of preparation for each x-ray exposure, improve the image quality of the x-ray apparatus, reduce the heat generated by the rotor control current in the x-ray tube, guarantee avoidance of the resonance frequency in the x-ray tube, and prolong the life of the x-ray tube. For example, every exposure technique has a minimum allowable anode speed of rotation. In most cases the anode speed of rotation does not need to be at its maximum before x-ray exposure can begin. By measuring the actual speed of rotation as disclosed in the present invention, it is possible to allow exposure at speeds lower than the maximum, reducing the time for preparation and optimizing the system parameters.

Similarly, the transition time between low power exposures and high power exposures can greatly be reduced. This can be very important in situations requiring radiographic exposures immediately following fluoroscopic examination. These situation can involve examining rapidly changing processes in which a fast transition can determine success or failure of the examination.

Under many current methods of rotational speed measurement, it is impossible to determine the speed of a coasting rotor. In fact, in many cases it is impossible to even determine that the rotor is coasting. The disclosed invention makes it possible to measure the speed of a coasting rotor. In low power exposure situations, such as fluoroscopy, a coasting rotor/anode may be sufficient to proceed with exposure. The ability to verify the actual speed of a coasting rotor/anode may allow exposure to start without any delay at all.

In many currently available x-ray systems, the acceleration and deceleration of the rotor is not controlled. To proceed from normal speed to high speed (or from zero to high speed) the required signal is applied and the user waits the required time period. Without feedback, there is not way to assure that the optimum profile has been chosen to make the most effective acceleration/deceleration. The speed feedback information of the present invention can be used to adjust the rotational speed of the anode to provide optimum conditions. For example, it is possible to improve the image quality by determining which rotational speed is sufficient for higher exposures and using this optimum speed to reduce the exposure time needed. This reduces image artifacts due to, among other things, patient motion.

The present invention also makes it possible to prolong the life of a rotating anode x-ray tube. By monitoring the actual rotor rotational speed, it is possible to guarantee that the resonance frequency is avoided. The life of the bearings can also be prolonged by avoiding having to go to the maximum rotational speed for every exposure.

In many prior art systems, the rotor control current requires substantial power for dynamically braking the rotor to make the anode stop without staying at the resonance frequency for any substantial period of time. The corresponding dissipation of power contributes to the overall power accumulation of the x-ray tube. The speed control method and apparatus of the present invention reduces this need. By reducing the time and current needed to realize an appropriate rotational speed and by avoiding braking the anode unless absolutely necessary, the heat accumulation and dissipation of the x-ray tube is reduced.

In addition, the reduced heat accumulation allows for better usage of the x-ray tube resources. If the heat exceeds the capacity of the x-ray tube, x-ray exposure is prohibited until the tube cools down. The reduced heat accumulation of the present invention allows for more x-ray exposures and less maintaining of rotor speed thus increasing the operational time of the x-ray tube between cooling periods.

DETAILED DESCRIPTION OF THE PREFERRED EMBODIMENT

In accordance with the present invention, a method and apparatus for measuring the speed of rotation of a rotor in an AC motor is described that provides distinct advantages when compared to those of the prior art. The invention can best be understood with reference to the accompanying drawing figures.

Figure 1:
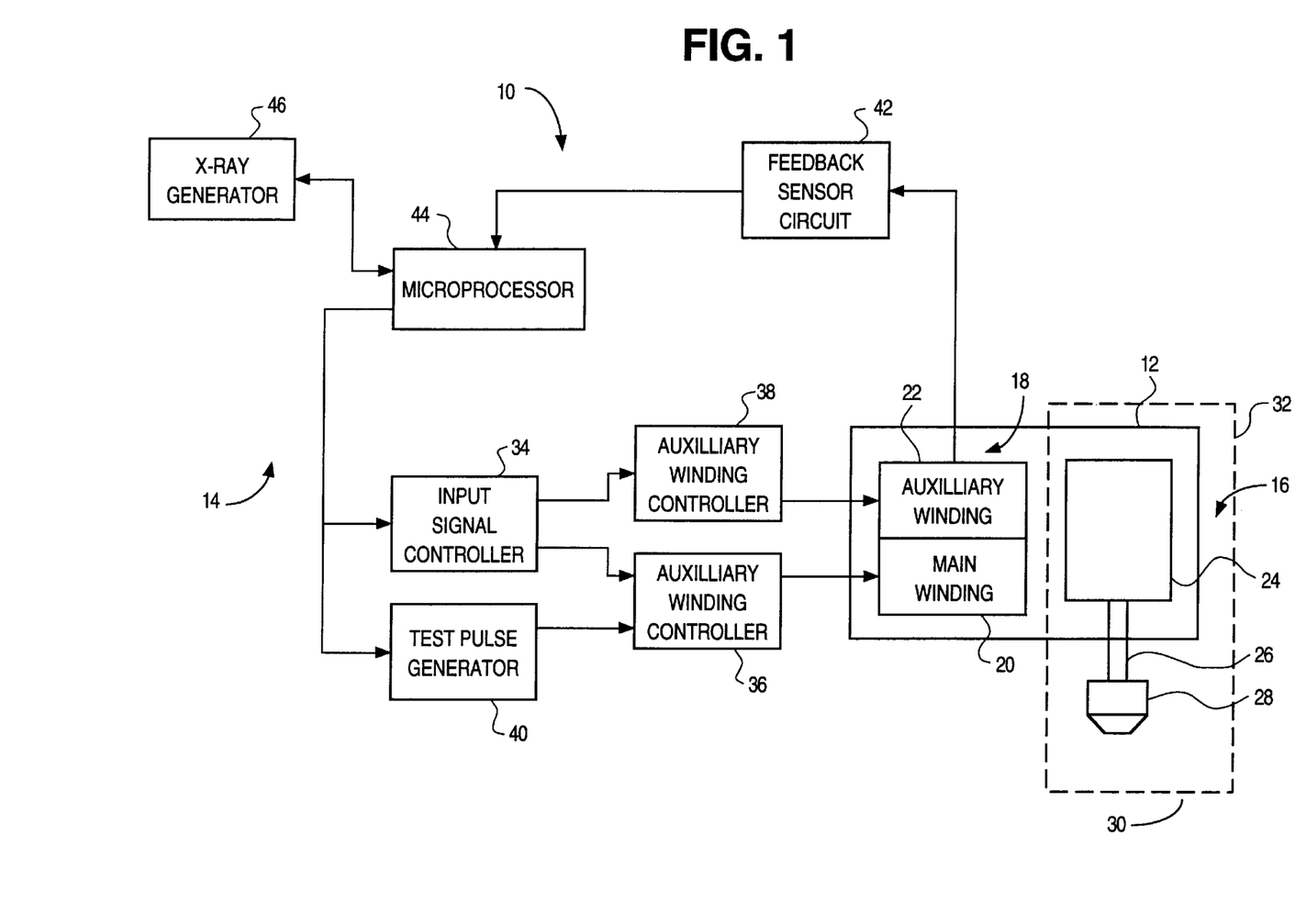
FIG. 1 is a schematic block diagram of a speed control apparatus according to the present invention in a rotating anode x-ray tube application.

Referring now to the figures, FIG. 1 shows an x-ray system, referred to generally at 10, which incorporates the motor 12 and speed control apparatus 14 of the present invention. In the preferred embodiment, the motor 12 is a two-phase motor which includes a rotor 16 and a stator 18.

The stator 18 comprises a core (not shown), a main winding 20 and an auxiliary winding 22. In the preferred embodiment, the core is constructed of laminated electrical grade steel to reduce losses due to "eddy currents" and to provide a good magnetic path. The windings 20 and 22 comprise copper wire wrapped around the core.

The poles of the stator (not shown) are shaped to fit the contour of the rotor 16. In the case of a rotation anode x-ray tube, the poles of the stator are shaped to fit the contour of the glass envelope 32. This reduces the gaps and lowers the reluctance (the opposition to the passage of magnetic flux lines) of the magnetic field between the stator 18 and the rotor 16. Air has a much higher reluctance than does the laminated steel used in the core.

The rotor 16 consists of a core 24 and a shaft 26. The core 24 is made of magnetic steel. The core 24 is pressure fitted onto the shaft 26. The shaft 26 is connected to the anode 28 of an x-ray tube 30.

Figure 4:
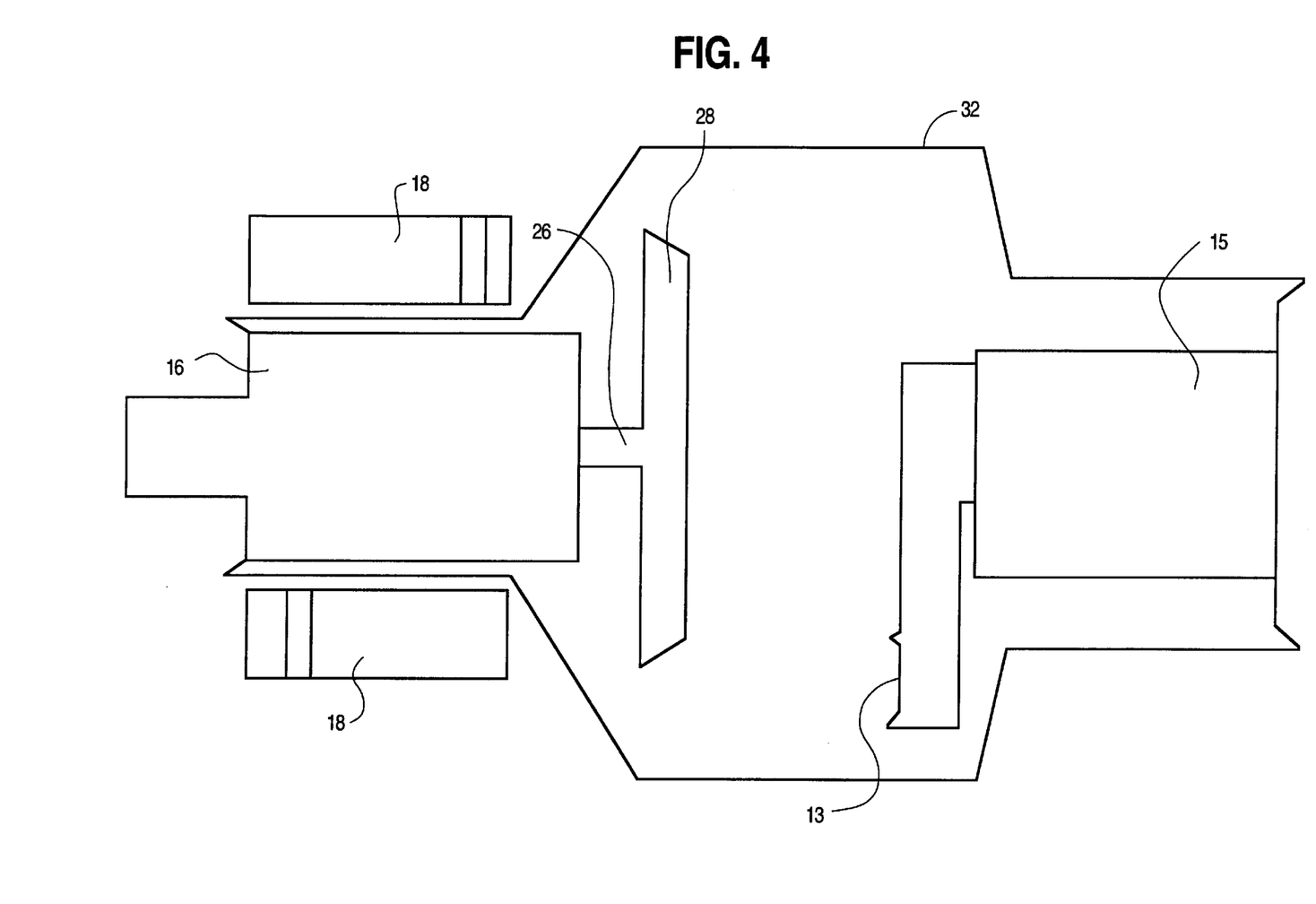
FIG. 4 is a schematic cross-sectional view of a rotating anode x-ray tube according to the present invention.

As shown in FIG. 4, a rotating anode x-ray tube including the motor 12 of the present invention comprises an anode 28, a filament and focusing cup 13 and a cathode support assembly 15. As is typical in conventional x-ray tubes, the filament and focusing cup 13 produce an electron beam which bombards the anode 28.

The anode 28 is configured to rotate with the rotor 16 and acts as a load to the motor 12. Both the rotor 16 and anode 28 are located in a vacuum inside the x-ray tube's glass envelope 32. The stator 18 is located outside of the glass envelope 32. Because of the construction of the x-ray tube 30, the efficiency of the motor 12 is typically very low. In addition, because the rotor 16 is operating in the vacuum and at high temperatures, the rotor ball bearings are configured to withstand these adverse conditions.

The speed control apparatus 14 comprises an input signal controller 34, a main winding controller 36, an auxiliary winding controller 38, a test pulse generator 40, a feedback sensor circuit 42 and a microprocessor 44. During normal operation, the input signal controller 34 supplies amplitude, frequency and phase information to each winding controller 36 and 38 depending on the desired operational routine (for example boost, run, stop, coast, etc.). The main and auxiliary winding controllers 36 and 38, synthesize sine wave input signals for the main and auxiliary windings 20 and 22, respectively based on the information supplied by the input signal controller 34.

The microprocessor 44 provides an operational routine input signal to the input signal generator 34 notifying the input signal generator 34 of the requested operation routine. The main winding controller 36 provides a sine wave input signal to the main windings 36 based on the requested operational routine. The auxiliary winding controller 38 provides a sine wave input to the auxiliary winding 22 which has the same frequency as the main winding signal but a different amplitude and phase.

Normally the auxiliary winding input signal is phase shifted 90° ahead of the main winding input signal. A phase shift of 90° behind the main winding input signal can be used to change the direction of rotation of the rotor 16 or to decelerate a rotating rotor 16.

During the speed measurement operation, the microprocessor 44 signals the input signal controller 34 to shut down, removing the input signals to the main and auxiliary windings 20 and 22 for a predetermined time long enough to demagnetize the rotor 16. In the preferred embodiment, 30 ms is sufficient to demagnetize the rotor 16.

Once the rotor 16 is demagnetized the microprocessor 44 activates the test pulse generator 40 which signals the main winding controller 36 to supply a test pulse of limited duration to the main winding 20. The input to the auxiliary winding 22 is removed for the entire duration of the measurement operation.

Figure 2A:
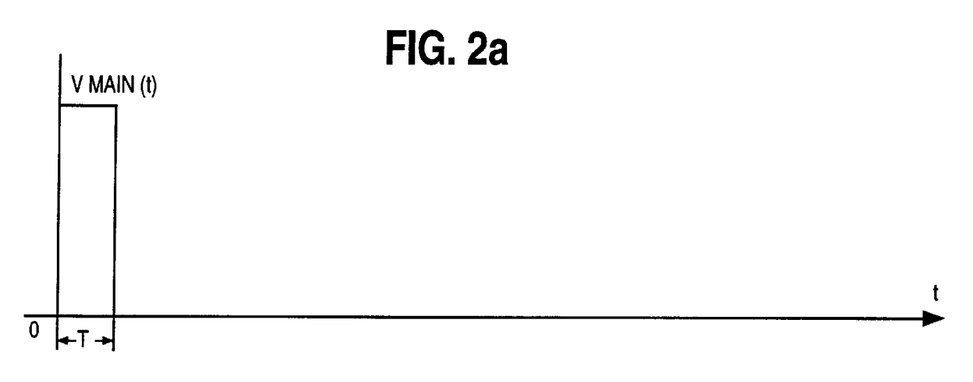
FIG. 2A is a graphical representation of a main winding test pulse according to the present invention.
Figure 2B:
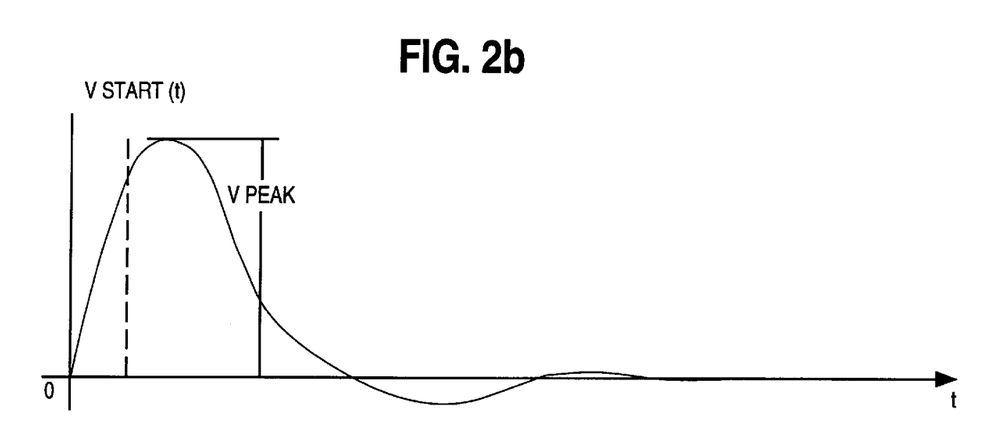
FIG. 2B is a graphical representation of an auxiliary winding EMF feedback signal corresponding to the test pulse of FIG. 2A.

The test pulse supplied to the main winding 20 magnetizes a portion of the rotor 16. This creates a "virtual permanent magnet" which rotates with the rotor 16 at the rotor's rotational speed. The rotation of the "virtual permanent magnet" induces an EMF feedback signal in the auxiliary winding 22 as shown in FIG. 2B. The time duration T of the pulse (as shown in FIG. 2A) must not exceed half a period of rotation of the highest possible rotational speed of the rotor 16. If the time duration T was allowed to exceed half a period of rotation, it is possible that the rotor 16 could be demagnetized.

The feedback sensor circuit 42 receives the EMF feedback signal, stores the peak value ($V_{peak}$) of the feedback signal, and provides feedback signal information, including the peak value and frequency of the feedback signal, to the microprocessor 44. In an x-ray tube environment, the EMF feedback signal is typically mixed with high frequency electrical noise, especially during X-ray exposure. Generally a filter (not shown) is provided in the feedback sensor circuit 42 to filter out the high frequency noise.

The frequency of the EMF feedback signal is equal to the actual speed of rotation of the rotor 16. The peak value of the EMF feedback signal is proportional to the speed of rotation of the rotor 16. The peak value of the signal also depends on the distance between the rotor 16 and stator windings 20 and 22 and the amplitude and duration of the test pulse.

The EMF feedback signal rapidly decreases with time. At high speeds of rotation, the first and second cycles of the EMF feedback signal can be used for measuring the frequency of the feedback signal. However at lower speeds, only the first cycle of the feedback signal can be used. Thus, the peak value of the feedback signal must be used to determine the speed of rotation of the rotor.

Prior to using the system 10 for measuring rotational speed, the system 10 must be calibrated. Typically, calibration is accomplished by measuring the peak value of the feedback signal at several speeds to determine a peak value verses speed profile for the system 10. A vibration tachometer or other conventional speed measurement device can be used to assist in producing the peak value verses speed profile. Also, it is possible to take frequency and peak value measurements at a high rotational speed using the feedback sensor circuit 42 in order to perform a self-calibration for the system 10.

The microprocessor 44 uses the speed profile to convert peak value measurements into the actual speed of rotation Specifically, the microprocessor 44 determines the rotational speed of the rotor 16 based on the value of $V_{peak}$ of the feedback signal. If the rotational speed meets exposure requirements, the microprocessor 44 provides a control signal to an x-ray generator 46 and the x-ray generator 46 executes an exposure.

If the rotational speed does not meet exposure requirements, the microprocessor 44 provides control signals to the input signal controller 34 to vary the rotational speed of the rotor 16. For example, if the microprocessor 44 determines that the rotational speed of the rotor 16 needs to be increased, the microprocessor 44 signals the input signal controller 34 to increase the frequency of the motor input signal. If the rotor 16 needs to be slowed down, the microprocessor 44 signals the input signal controller 34 to decrease the frequency of the motor input signal. After each increase or decrease, or each period of coasting, the system 10 rechecks the rotational speed of the rotor 16 to see if rotor 16 is now rotating at the proper speed. This process continues in iterations until the proper speed is accomplished by providing the described closed loop rotational speed control.

Figure 3:
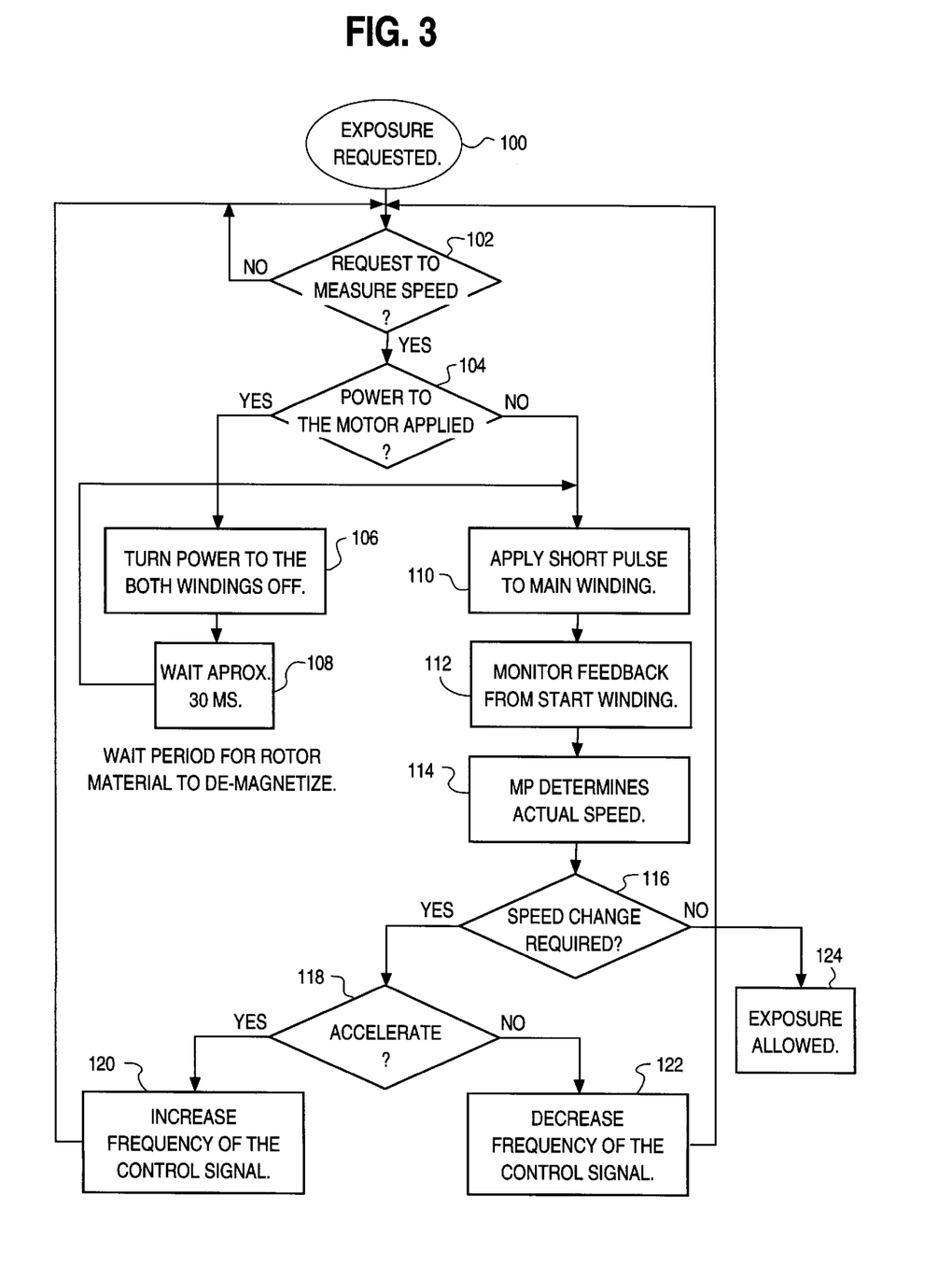
FIG. 3 is a schematic block diagram of the method of determining rotational speed during an exposure request according to the present invention.

The exposure request process flow of a rotating anode x-ray tube system embodying the speed control method and apparatus of the present invention is shown in FIG. 3. The exposure request initiates a request to measure speed 102. The request to measure speed 102 begins by checking to see if power is currently being supplied 104 to the motor 12. If power is being supplied to the motor 12, the microprocessor 44 signals the input signal controller 34 to turn off power 106 to the windings 20 and 22. Once the power is shut off, the system 10 waits approximately 30 ms 108 so that the rotor 16 is demagnetized.

If power is not being supplied to the motor 12 or once the rotor 16 has been demagnetized, the test pulse generator 40 signals the main winding controller 36 to generate a short test pulse 110 of limited duration to the main winding 20. After the test pulse has been generated, the feedback sensor circuit 42 begins monitoring 112 the auxiliary winding 22 for an EMF feedback signal induced by the portion of the rotor 16 magnetized by the test pulse.

The feedback sensor circuit 42 supplies feedback signal information to the microprocessor 44 which determines the actual speed 114 of the rotor 16 based on the feedback signal information. The microprocessor 44 then determines whether or not a speed change is required 116. If a speed change is required, the microprocessor 44 determines whether or not the motor must be accelerated 118. If an acceleration is required, the frequency of the motor input signal is increased 120 and the system 10 requests another speed measurement operation 102. If an acceleration is not required, the frequency of the motor input signal is decreased 122 and another speed measurement operation 102 is requested. If no speed change is required, exposure is allowed 124.

This speed adjustment routine is repeated until the proper speed is reached. By reusing the speed measurement results as described herein and shown in FIG. 3, an iterative, closed loop rotational speed control system is provided for controlling the rotational speed of the rotor 16 and thus the attached anode 28

It will be apparent to those skilled in the art that modifications may be made without departing from the spirit and scope of the invention, Accordingly, it is not intended that the invention be limited except as may be necessary in view of the appended claims.

What is claimed is:

1. A method for determining the speed of rotation of a rotor in a motor having a stator with main and auxiliary windings, the method comprising the steps of:

magnetizing a portion of the rotor by supplying a test current pulse of limited duration to the main winding;

receiving a feedback signal corresponding to an EMF signal induced in the auxiliary winding by the magnetized portion of the rotor;

determining the speed of rotation of the rotor based on said feedback signal.

2. The method of claim 1 further comprising the step of:

prior to the magnetizing step, demagnetizing the rotor by removing signals from both the main and auxiliary windings for a predetermined amount of time.

3. The method of claim 1 wherein the step of receiving a feedback signal further comprises measuring a peak value of said corresponding EMF signal.

4. The method of claim 3 wherein the speed of rotation is determined based on said peak value.

5. The method of claim 1 wherein the step of receiving further comprises measuring the frequency of said corresponding EMF signal.

6. The method of claim 5 wherein the speed of rotation is determined based on said measured frequency.

7. A speed control apparatus for determining the speed of rotation of a rotor in a motor having a stator with main and auxiliary windings, the speed control apparatus comprising:

pulse generator means connected to the main winding for providing an input pulse of limited duration to the main winding to magnetize a portion of said rotor;

feedback means connected to the auxiliary winding for receiving a feedback signal from the auxiliary winding corresponding to an EMF signal induced in the auxiliary winding in response to said main winding input pulse magnetizing the rotor; and processor means operably connected to said feedback means for determining the speed of rotation of the rotor based on said feedback signal.

8. The speed control apparatus of claim 7 wherein said feedback means further measures a peak value of said feedback signal and said processor means determines the speed of rotation based on said peak value.

9. The speed control apparatus of claim 7 wherein said feedback means further measures the frequency of said feedback signal and said processor means determines the speed of rotation based on said measured frequency.

10. The speed control apparatus of claim 7 further comprising:
   input signal generator means for generating input signals to the main and auxiliary windings causing the rotor to rotate.

11. The speed control apparatus of claim 10 wherein said input signal generator means further comprises:
   input signal controller means for providing motor input signal information;
   main winding control means operably connected to said input signal controller means for generating an input signal supplied to the main winding based on said motor input signal information provided by said input signal controller means;
   auxiliary winding control means operably connected to said input signal controller means for generating an input signal supplied to the auxiliary winding based on said motor input signal information provided by said input signal controller means;
   wherein said main and auxiliary winding control means are configured to demagnetize the rotor by removing input signals from the main and auxiliary windings for a predetermined amount of time.

12. The speed control apparatus of claim 11 wherein said processor means is operably connected to said input signal controller means for adjusting the speed of rotation of the rotor by controlling the motor input signal information generated by said input signal controller means.

13. The speed control apparatus of claim 12 wherein said speed adjustment is accomplished by performing iterative speed determinations and adjustments until a desired speed is accomplished.

14. The speed control apparatus of claim 13 wherein said apparatus is a closed loop system.

15. The speed control apparatus of claim 7 wherein said processor means comprises a microprocessor.

16. The speed control apparatus of claim 7 wherein the motor comprises an x-ray tube anode motor having an anode operably connected to the rotor.

17. The speed control apparatus of claim 16 further comprising an x-ray generator operably connected to said processor means for generating a large amount of power to a rotating anode x-ray tube having said x-ray tube anode motor for an x-ray exposure operation.

18. An AC motor comprising:
   a rotor configured to rotate at a rotational speed;
   a stator having main and auxiliary windings;
   signal generator means for generating motor input signals for said main and auxiliary windings, said auxiliary winding motor input signal being phase offset from said main winding motor input signal producing a rotating magnetic field which causes an EMF in said rotor causing said rotor to rotate;
   pulse generator means operably connected to said main winding for providing an input pulse of limited duration to said main winding to magnetize a portion of said rotor;
   feedback means operably connected to said auxiliary winding for receiving a feedback signal from said auxiliary winding corresponding to an EMF signal induced in the auxiliary winding in response to said main winding input pulse magnetizing the rotor; and
   processor means operably connected to said feedback means for determining the speed of rotation of the rotor based on said feedback signal.

19. The motor of claim 18 wherein said feedback means further measures a peak value of said feedback signal and said processor means determines the speed of rotation based on said peak value.

20. The motor of claim 18 wherein said feedback means further measures a frequency of said feedback signal and said processor means determines the speed of rotation based on said measured frequency.

21. The motor of claim 18 wherein said signal generator means further comprises:
   input signal controller means for generating input signal information;
   main winding control means operably connected to said input signal controller means for generating an input signal supplied to the main winding based on said input signal information; and
   auxiliary winding control means operably connected to said input signal controller means for generating an input signal supplied to the auxiliary winding based on said input signal information.

22. The motor of claim 21 wherein said main and auxiliary winding control means further being configured to demagnetize the rotor by removing input signals from the main and auxiliary windings for a predetermined amount of time.

23. The motor of claim 18 further comprising an x-ray tube anode operably connected to said rotor and configured to rotate with said rotor.

24. The motor of claim 23 further comprising an x-ray generator operably connected to said processor means for generating a large amount of power to a rotating anode x-ray tube having said x-ray tube anode rotor for an x-ray exposure operation.

25. The motor of claim 23 further comprising a vacuum sealed glass envelope wherein said rotor and said anode are positioned inside of said glass envelope and said stator is positioned outside of said glass envelope.

26. An x-ray system comprising:
   a rotating anode x-ray tube having an anode inside a vacuum sealed glass tube;
   an x-ray generator means for providing power to said x-ray tube for an x-ray exposure operation;
   a motor having a stator outside said glass tube and a rotor inside said glass tube, said rotor being operably connected to said anode and said stator having a main winding and an auxiliary winding;
   signal generator means for generating motor input signals for said main and auxiliary windings, said auxiliary winding motor input signal being phase offset from said main winding motor input signal producing a rotating magnetic field which causes an EMF in said rotor causing said rotor to rotate;
   pulse generator means operably connected to said main winding for providing an input pulse of limited duration to said main winding to magnetize a portion of said rotor;
   feedback means operably connected to said auxiliary winding for receiving a feedback signal from said auxiliary winding corresponding to an EMF signal induced in the auxiliary winding in response to said main winding input pulse magnetizing the rotor; and processor means operably connected to said feedback means for determining a speed of rotation of said rotor based on said feedback signal.

27. The x-ray system of claim 26 wherein said feedback means further measures a peak value of said feedback signal and said processor means determines the speed of rotation based on said peak value.

28. The x-ray system of claim 26 wherein said feedback means further measures a frequency of said feedback signal and said processor means determines the speed of rotation based on said measured frequency.

29. The x-ray system of claim 26 wherein said signal generator means further comprises:

input signal controller means for generating input signal information;

main winding control means operably connected to said input signal controller means for generating an input signal supplied to the main winding based on said input signal information; and auxiliary winding control means operably connected to said input signal controller means for generating an input signal supplied to the auxiliary winding based on said input signal information.

30. The x-ray system of claim 29 wherein said main and auxiliary winding control means further being configured to demagnetize the rotor by removing input signals from the main and auxiliary windings for a predetermined amount of time.

31. The motor of claim 26 further comprising a vacuum sealed glass envelope wherein said rotor and said anode are positioned inside of said glass envelope and said stator is positioned outside of said glass envelope.

32. A method for performing an x-ray exposure using an x-ray system including a rotating anode x-ray tube having a rotating anode connected to a motor having a rotor and a stator, the anode being connected to the rotor and being configured to rotate with the rotor and the stator having a main and an auxiliary winding the method comprising the steps of:

measuring the speed of rotation of the rotating anode by magnetizing a portion of the rotor by applying a test pulse to the main winding, receiving a feedback signal corresponding to an EMF signal induced in the auxiliary winding by the magnetized portion of the rotor, and determining the speed of rotation of the rotor based on said feedback signal;

comparing the measured speed of rotation of the anode to a predetermined desired speed of rotation;

increasing the speed of rotation of the rotor if the measured speed of rotation of the anode is less than the desired speed of rotation and reexecuting the measuring and comparing steps;

decreasing the speed of rotation of the rotor if the measured speed of rotation of the anode is greater than the desired speed of rotation and reexecuting the measuring and comparing steps; and allowing x-ray exposure if the measured speed of rotation of the anode is equal to the desired speed of rotation.

33. The method of claim 32 further comprising the steps of:

determining whether power is being supplied to the motor prior to the measuring step; and turning off the power to the motor if power is being supplied to the motor for a predetermined period of time calculated to demagnetize the rotor.

34. The method of claim 32 wherein the step of measuring further comprises measuring a peak value of said corresponding EMF signal.

35. The method of claim 34 wherein the speed of rotation is determined based on said peak value of said corresponding EMF signal.

36. The method of claim 32 wherein the step of measuring further comprises measuring a frequency of said corresponding EMF signal.

37. The method of claim 36 wherein the speed of rotation is determined based on said measured frequency of said corresponding EMF signal.

38. The method of claim 32 wherein said motor further includes motor input signal controller means for supplying an input signal of predetermined frequency to the motor the step of increasing the speed further comprising increasing the frequency of the input signal supplied to the motor.

39. The method of claim 32 wherein said motor further includes motor input signal controller means for supplying an input signal of predetermined frequency to the motor the step of decreasing the speed further comprising decreasing the frequency of the input signal supplied to the motor.

* * * * *

UNITED STATES PATENT AND TRADEMARK OFFICE
CERTIFICATE OF CORRECTION

PATENT NO. : 5,883,487

DATED : March 16, 1999

INVENTOR(S) :. Rosenzweig et al.

It is certified that error appears in the above-identified patent and that said Letters Patent is hereby corrected as shown below:

On the title page, item [75] inventors, please add –James A. Princehorn, Sandyhook, CT--.

Column 3, line 29, "reahuested" should be –requested--.

Signed and Sealed this

Twenty-eighth Day of September, 1999

*Attest:*

Q. TODD DICKINSON

*Attesting Officer*  *Acting Commissioner of Patents and Trademarks*